United States Patent [19]

Kim

[11] Patent Number: 5,078,530

[45] Date of Patent: Jan. 7, 1992

[54] PLASTIC COUPLING DEVICE FOR CONNECTING TWO BUILDING ELEMENTS

[75] Inventor: Byong Y. Kim, Falls Church, Va.

[73] Assignee: Permanent Solution Industries, Inc., Falls Church, Va.

[21] Appl. No.: 691,809

[22] Filed: Apr. 26, 1991

[51] Int. Cl.⁵ ............................................. F16D 1/00
[52] U.S. Cl. ................................. 403/24; 403/331; 403/338; 403/363; 52/75
[58] Field of Search .................... 52/75, 74, 471, 588; 403/331, 338, 24, 363

[56] References Cited

U.S. PATENT DOCUMENTS 2,539,705  1/1951  Simonton ................................. 52/75
2,751,640  6/1956  Miller et al. ........................ 52/75 X Primary Examiner—Andrew V. Kundrat
Attorney, Agent, or Firm—Birch, Stewart, Kolasch & Birch

[57] ABSTRACT

A plastic coupling device for connecting two building elements includes a T-shaped coupling member having two inwardly bent ends and an adjacent pair of W-shaped plates each having inwardly bent ends, respectively, for slidably, tightly receiving the T-shaped coupling member along adjacent side portions of the W-shaped plates so as to form a composite ceiling plate used in building ceilings.

2 Claims, 1 Drawing Sheet

PLASTIC COUPLING DEVICE FOR CONNECTING TWO BUILDING ELEMENTS

BACKGROUND OF THE INVENTION

1. Field of the Invention

The present invention relates to a plastic coupling device for connecting two elements and more particularly, to an improved plastic coupling device for connecting two elements such as building elements for forming a composite plate as a boarded ceiling for use in ceiling buildings of a garage, a veranda, a porch, and the like.

2. Description of the Prior Art

Various types of coupling devices are well known in the art. Such coupling devices commonly used utilize bolts and nuts or engagements. However, tinplate ducts which include a T-shaped engagement are too thin and light to bear their weight. However, generally, such coupling devices suffer from a number of disadvantages such as, for example (a) it is very difficult for workers to connect a plurality of plates by using bolts and nuts for buildings having high ceilings in garages, verandas, porches, and the like, (b) assembled ceiling plates are difficult to maintain for a long life period time, and (c) such plates are frequently cracked due to changes in atmospheric conditions and temperatures.

SUMMARY OF THE INVENTION

Accordingly, it is an object of the present invention to provide a coupling device for connecting two building elements which eliminates the above disadvantages encountered in conventional coupling devices.

Another object of the present invention is to provide an assembled, boarded ceiling plate assembled by a plurality of coupling devices wherein each of coupling devices includes a pair of building elements and a coupling element for connecting the pair of building elements.

A further object of the present invention is to provide an improved coupling device including T-shaped, elongated coupling members and W-shaped, elongated plates for slidably, tightly receiving the T-shaped coupling members to join adjacent sides of the W-shaped plates. Accordingly, the other sides of W-shaped plates are respectively engaged with a plurality of T-shaped coupling members so as to join a plurality of W-shaped plates, respectively for forming a composite ceiling board.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a plastic coupling device for connecting two building elements, which includes a T-shaped coupling member having inwardly bent ends and a pair of W-shaped plates having inwardly bent ends, which slidably, tightly receive the T-shaped coupling member to join adjacent sides of the W-shaped plates so as to form a composite ceiling plate used in building ceilings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figures 1, 2, 3:
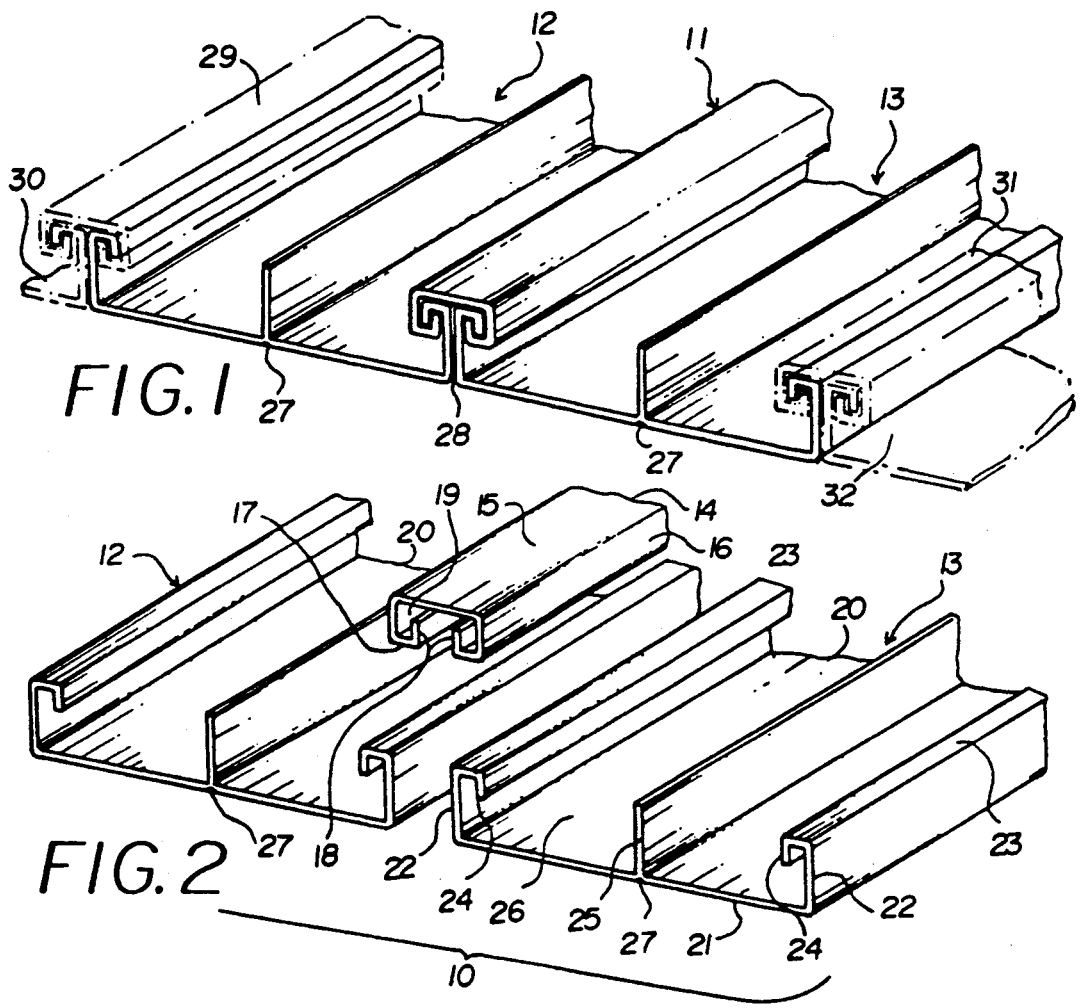
FIG. 1 is a perspective view of a plastic coupling device for connecting two building elements according to the present invention.
FIG. 2 is an enlarged, exploded perspective view for connecting two building elements according to the present invention.
FIG. 3 is a cross-sectional view of FIG. 1, taken along line 3—3.

Referring now in detail to the drawings for the purpose of illustrating preferred embodiments of the present invention, the plastic coupling device for connecting two building elements as shown in FIGS. 1, 2, and 3, comprises an elongated coupling member 11 being adapted to connect two adjacent, elongated plates or similar elements for forming a plastic boarded ceiling plate for use as a ceiling in garages or other similar buildings. A ceiling plate section includes a first member 12 joined to an adjacent second member 13.

The elongated coupling member 11 is formed to define a somewhat T-shaped, elongated joint member 14 having a top plate 15, two side plates 16, two bottom plates 17, and two inwardly bent end plates 18 for forming a T-shaped space 19 disposed therein.

The first and second elongated members 12 and 13 are joined to define an elongated composite plate as a boarded ceiling. Each W-shaped elongated plate 20 includes a bottom plate 21, two side plates 22, two top plates 23, two inwardly bent end plates 24, and an elongated partition 25 disposed in the center of the inner surface of the bottom plate 21 for defining a W-shaped space 26. Two side plates 22 extend approximately perpendicularly from the bottom plate 21 and two top plates 23 extend approximately perpendicularly from two side plates 22. Also, the W-shaped elongated plate 20 includes a slot line 27 disposed on the outer surface of the bottom plate 21 thereof corresponds in a parallel manner with a connecting line 28 formed by coupling the first member 12 and the second member 13. The coupling device 10 may be made mainly of plastic or other similar materials. The plastic coupling device 10 is applied to buildings as a waterproof ceiling board such as for example in a garage, a veranda, a porch and the like. The length of the plastic coupling device 10 may be about 36 to 40 feet and the width depends on the number of coupled adjacent members.

The plastic coupling device 10 according to the present invention is assembled as follows.

As shown in FIGS. 1 and 3, the elongated coupling member 11 is inserted along adjacent sides of the first and second elongated members 12 and 13 so that side plates 16, bottom plates 17, and inwardly bent end plates 18 of the coupling member 11 slidably contact side plates 22, top plates 23, and inwardly bent end plates 24 of the first and second members 12 and 13, respectively, within the T-shaped space 19. Therefore, the bent ends of the coupling member 11 and the first and second members 12 and 13 are tightly engaged with each other so that building elements are formed as a composite ceiling board.

Accordingly, first of all, as shown in FIG. 1, after a first coupling member 11 is coupled to adjacent side portions of the first and second members 12 and 13 to form a first building element, a second coupling member 29 is used to couple a free side portion of the first member 12 with an adjacent side portion of a third member 30. Also, a third coupling member 31 is used to couple the other free side portion of the second member 13 and an adjacent side portion of a fourth member 32. Thus, the coupling device according to the present invention can used to continuously connect numerous adjacent plates to each other for forming a composite ceiling plate for use in building ceilings, such as a waterproof ceiling for garages, verandas, porches, and the like.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A plastic coupling device comprising:
    an elongated coupling member, said elongated coupling member having:
    a top plate,
    two side plates extending approximately perpendicularly from said top plate,
    two bottom plates extending approximately perpendicularly from said side plates, respectively, and
    two inwardly bent end plates extending approximately perpendicularly from said bottom plates, respectively; and
  a pair of adjacently placed elongated plate members for being operatively coupled by said elongated coupling member, each of said elongated plate members having:
    a bottom plate having an elongated slot line disposed in the center thereof,
    two side plates extending approximately perpendicularly from said bottom plate,
    two top plates extending approximately perpendicularly from said side plates, respectively,
    two inwardly bent end plates extending approximately perpendicularly from said top plates, respectively; and
    an elongated partition disposed in the center of the inner surface of said bottom plate and the opposite side from said elongated slot line, whereby the elongated coupling member is tightly coupled with the pair of elongated members by slidably engaging both side portions of the elongated coupling member with both inner side spaces of a W-shaped space of the pair of profile members and in turn, engaging both inner side portions of the pair of profile members with a T-shaped space of the coupling member.

2. The plastic coupling device of claim 1, wherein the elongated portion and slot line of the pair of profile members are disposed in parallel with a connecting line formed by coupling said elongated coupling member and said pair of elongated plate members.

* * * * *